(12) United States Patent
Li et al.

(10) Patent No.: US 8,929,309 B2
(45) Date of Patent: Jan. 6, 2015

(54) LONG-TERM FEEDBACK TRANSMISSION AND RANK REPORTING

(75) Inventors: Yan Li, Coopersburg, PA (US); Guodong Zhang, Syosset, NY (US); Afshin Haghighat, Ile-Bizard (CA)

(73) Assignee: Interdigital Patent Holdings, Inc., Wilmington, DE (US)

( * ) Notice: Subject to any disclaimer, the term of this patent is extended or adjusted under 35 U.S.C. 154(b) by 256 days.

(21) Appl. No.: 13/162,102

(22) Filed: Jun. 16, 2011

(65) Prior Publication Data

US 2012/0147933 A1   Jun. 14, 2012

Related U.S. Application Data

(60) Provisional application No. 61/356,345, filed on Jun. 18, 2010.

(51) Int. Cl.
| | |
|---|---|
| H04B 7/04 | (2006.01) |
| H04L 1/06 | (2006.01) |
| H04L 1/20 | (2006.01) |
| H04L 25/03 | (2006.01) |
| H04L 1/00 | (2006.01) |
| H04B 7/06 | (2006.01) |
| H04L 5/00 | (2006.01) |

(52) U.S. Cl.
CPC ............ *H04L 1/0026* (2013.01); *H04B 7/0632* (2013.01); *H04L 1/06* (2013.01); *H04B 7/065* (2013.01); *H04L 1/20* (2013.01); H04B 7/0417 (2013.01); H04L 5/0007 (2013.01); *H04B 7/0639* (2013.01); *H04L 25/03343* (2013.01)
USPC .......................................... 370/329; 370/330

(58) Field of Classification Search
CPC .................................... H04B 7/04; H04L 5/00
USPC .......................................................... 370/329
See application file for complete search history.

(56) References Cited

U.S. PATENT DOCUMENTS

| | | | |
|---|---|---|---|
| 7,050,776 B2 | 5/2006 | Kim et al. |
| 8,315,346 B2 | 11/2012 | Kim et al. |

(Continued)

FOREIGN PATENT DOCUMENTS

| | | | |
|---|---|---|---|
| EP | 1306983 A1 | 5/2003 |
| EP | 1353452 A2 | 10/2003 |

(Continued)

OTHER PUBLICATIONS

3rd Generation Partnership Project (3GPP), R1-091520, "Analysis of Feedback Signalling for Downlink CoMP", CATT, 3GPP TSG RAN WG1 meeting #56bis, R1-091520, Korea, Mar. 23-27, 2009, 3 pages.

(Continued)

*Primary Examiner* — Ayaz Sheikh
*Assistant Examiner* — Tarell Hampton
(74) *Attorney, Agent, or Firm* — Condo Roccia Koptiw, LLP

(57) ABSTRACT

Disclosed herein are systems and methods for long-term feedback transmitting and rank reporting. According to an aspect, a method of feedback reporting may be implemented at a WTRU. The method may include determining a long-term precoder and a short-term precoder. The method may also include calculating channel quality index (CQI) based on the long-term precoder and the short-term precoder. Further, the method may include transmitting the CQI to a base station.

14 Claims, 9 Drawing Sheets

(56) References Cited

U.S. PATENT DOCUMENTS

| | | |
|---|---|---|
| 8,611,905 B2 | 12/2013 | Zhu et al. |
| 2006/0270360 A1* | 11/2006 | Han et al. .................... 455/69 |
| 2008/0229177 A1* | 9/2008 | Kotecha .................... 714/776 |
| 2008/0232501 A1* | 9/2008 | Khojastepour et al. ....... 375/267 |
| 2009/0046569 A1* | 2/2009 | Chen et al. ................... 370/203 |
| 2009/0122857 A1 | 5/2009 | Li et al. |
| 2009/0190528 A1* | 7/2009 | Chung et al. ................. 370/328 |
| 2009/0203335 A1* | 8/2009 | Lee et al. .................... 455/103 |
| 2012/0201282 A1* | 8/2012 | Li et al. ..................... 375/219 |

FOREIGN PATENT DOCUMENTS

| | | |
|---|---|---|
| EP | 2273691 A1 | 1/2011 |
| EP | 2560296 A2 | 2/2013 |
| JP | 2003-143068 (A) | 5/2003 |
| JP | 2006-238314 (A) | 9/2006 |
| JP | 2007-515834 (A) | 6/2007 |
| JP | 2009-530898 (A) | 8/2009 |
| JP | 2013-528027 (A) | 7/2013 |
| WO | WO 2005/043851 A1 | 5/2005 |
| WO | WO 2008/021027 A2 | 2/2008 |
| WO | WO 2009/124452 A1 | 10/2009 |
| WO | WO 2011/126160 A1 | 10/2011 |
| WO | WO 2011/129583 A2 | 10/2011 |

OTHER PUBLICATIONS

Erik et al., "Closed Loop MIMO Precoding", IEEE 802.16 Broadband Wireless Access Working Group <http://ieee802.orgl16>, Nov. 4, 2004, 19 pages.

Lindskog et al., "Closed Loop MIMO Precoding", IEEE 802.16 Presentation Submission Template (Rev. 8.3), IEEE S802.16e/04/293r2, IEEE 802 Plenary, San Antonio, Texas, U.S.A., Nov. 22, 2004, 28 pages.

Ericsson, ST-Ericsson, "PMI-based Multi-Granular Feedback for SU/MU-MIMO Operation", R1-100852, 3GPP TSG-RAN WG1 #60, San Francisco, USA, Feb. 22-26, 2010, 6 pages.

LG Electronics, "DL Codebook design for 8Tx precoding", R1-102380, 3GPP TSG RAN WG1 Meeting #60bis, Beijing, China, Apr. 12-16, 2010, 4 pages.

Ericsson, ST-Ericsson, "Refinements of Feedback and Codebook Design", R1-10333, 3GPP TSG-RAN WG1 #61, Montreal, Canada, May 10-14, 2010, 12 pages.

\* cited by examiner

LONG-TERM FEEDBACK TRANSMISSION AND RANK REPORTING

CROSS REFERENCE TO RELATED APPLICATION

This application claims the benefit of U.S. Provisional Patent Application No. 61/356,345, filed Jun. 18, 2010, the content of which is hereby incorporated by reference in its entirety.

BACKGROUND

The Third Generation Partnership Project (3GPP) Long Term Evolution (LTE) standards provide specifications for high performance air interfaces for cellular mobile communications systems. In LTE, a wireless transmit receiver unit (WTRU) may communicate with an eNodeB (eNB). The WTRU may send the eNB certain feedback to give the eNB an indication of the quality of the channel across which the WTRU and eNB are communicating. One particular type of feedback is channel quality index (CQI) report (hereinafter "CQI"). CQI may be transmitted by the WTRU on a periodic basis or an aperiodic basis. A periodic CQI may be transmitted on the physical uplink control channel (PUCCH) or the physical uplink shared channel (PUSCH). An aperiodic CQI may be transmitted on the PUSCH. It is desired to provide more efficient systems and methods for CQI and other feedback reporting.

SUMMARY

Disclosed herein are systems and methods for long-term feedback transmitting and rank reporting. According to an aspect, a method of feedback reporting may be implemented at a WTRU. The method may include determining a long-term precoder and a short-term precoder. The method may also include calculating channel quality index (CQI) based on the long-term precoder and the short-term precoder. Further, the method may include transmitting the CQI to a base station.

According to another aspect, a method may include determining a long-term precoder and short-term precoder. The method may also include determining a rank of the long-term precoder. Further, the method may include determining a rank of the short-term precoder based on the rank of the long-term precoder. The method may also include transmitting the short-term precoder and the rank of the short-term precoder to a base station.

According to yet another aspect, a method may include determining a long-term precoder. The method may also include transmitting, to a base station, a long-term precoder matrix index (PMI) corresponding to the long-term precoder. Further, the method may include determining a short-term PMI. The method may also include determining a rank of the short-term PMI. The method may also include transmitting, to the base station, the short-term PMI and the rank of the short-term PMI.

The Summary is provided to introduce a selection of concepts in a simplified form that are further described below in the Detailed Description. This Summary is not intended to identify key features or essential features of the claimed subject matter, not is it intended to be used to limit the scope of the claimed subject matter. Furthermore, the claimed subject matter is not limited to any limitations that solve any or all disadvantages noted in any part of this disclosure.

BRIEF DESCRIPTION OF THE DRAWINGS

The following detailed description of embodiments is better understood when read in conjunction with the appended drawings. For the purposes of illustration, there is shown in the drawings exemplary embodiments; however, the subject matter is not limited to the specific elements and instrumentalities disclosed. In the drawings.

DETAILED DESCRIPTION

When referred to hereafter, the terminology "wireless transmit/receive unit (WTRU)" includes, but is not limited to, a user equipment (UE), a mobile station, a fixed or mobile subscriber unit, a pager, a cellular telephone, a personal digital assistant (PDA), a computer, or any other type of user device capable of operating in a wireless environment. When referred to hereafter, the terminology "base station" includes, but is not limited to, a NodeB, a site controller, an access point (AP), or any other type of interfacing device capable of operating in a wireless environment.

Figure 1A:
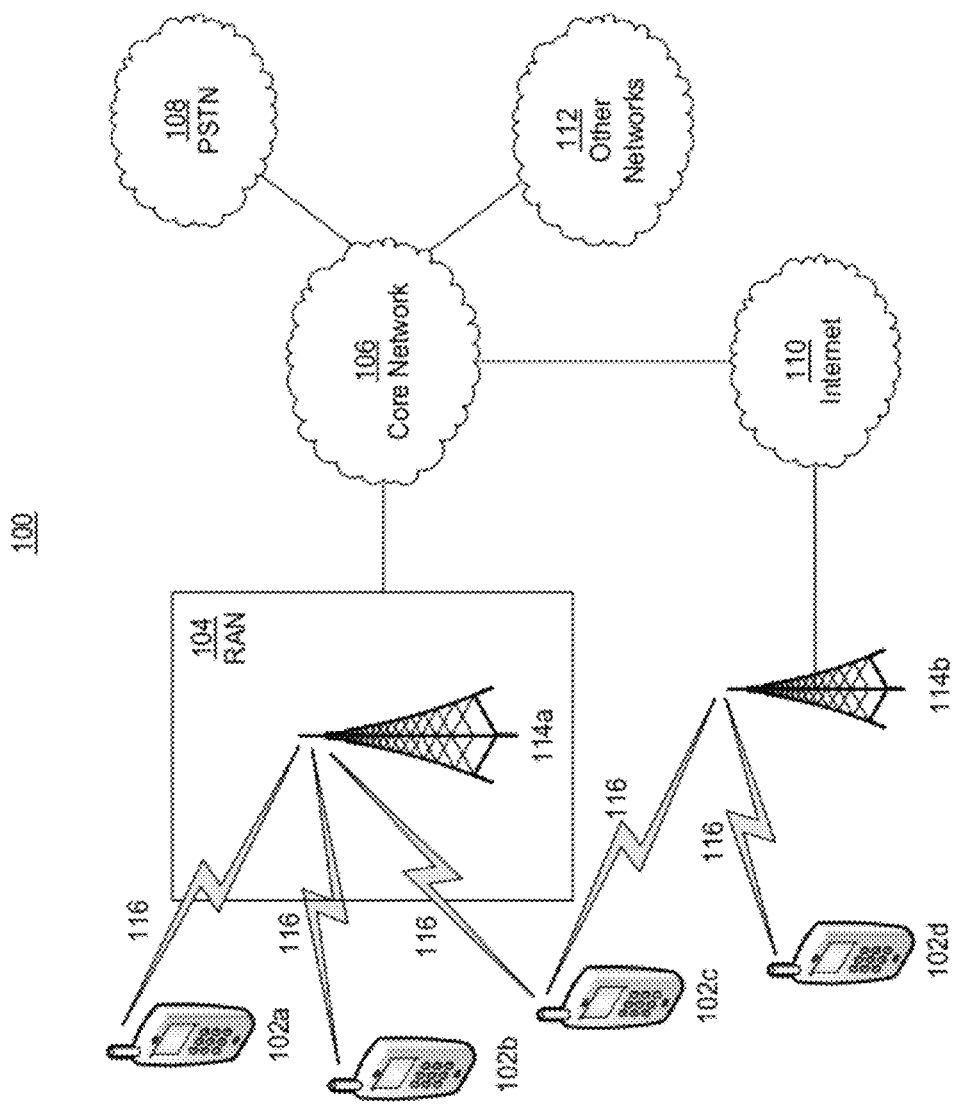
FIG. 1A is a system diagram of an example communications system in which one or more disclosed embodiments may be implemented.

FIG. 1A is a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include wireless transmit/receive units (WTRUs) 102a, 102b, 102c, 102d, a radio access network (RAN) 104, a core network 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106, the Internet 110, and/or the networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, i.e., one for each sector of the cell. In another embodiment, the base station 114a may employ multiple-input multiple output (MIMO) technology and, therefore, may utilize multiple transceivers for each sector of the cell.

The base stations 114a, 114b may communicate with one or more of the WTRUs 102a, 102b, 102c, 102d over an air interface 116, which may be any suitable wireless communication link (e.g., radio frequency (RF), microwave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A).

In other embodiments, the base station 114a and the WTRUs 102a, 102b, 102c may implement radio technologies such as IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 1A, the base station 114b may have a direct connection to the Internet 110. Thus, the base station 114b may not be required to access the Internet 110 via the core network 106.

The RAN 104 may be in communication with the core network 106, which may be any type of network configured to provide voice, data, applications, and/or voice over internet protocol (VoIP) services to one or more of the WTRUs 102a, 102b, 102c, 102d. For example, the core network 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the core network 106 may be in direct or indirect communication with other RANs that employ the same RAT as the RAN 104 or a different RAT. For example, in addition to being connected to the RAN 104, which may be utilizing an E-UTRA radio technology, the core network 106 may also be in communication with another RAN (not shown) employing a GSM radio technology.

The core network 106 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 104 or a different RAT.

Some or all of the WTRUs 102a, 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

Figure 1B:
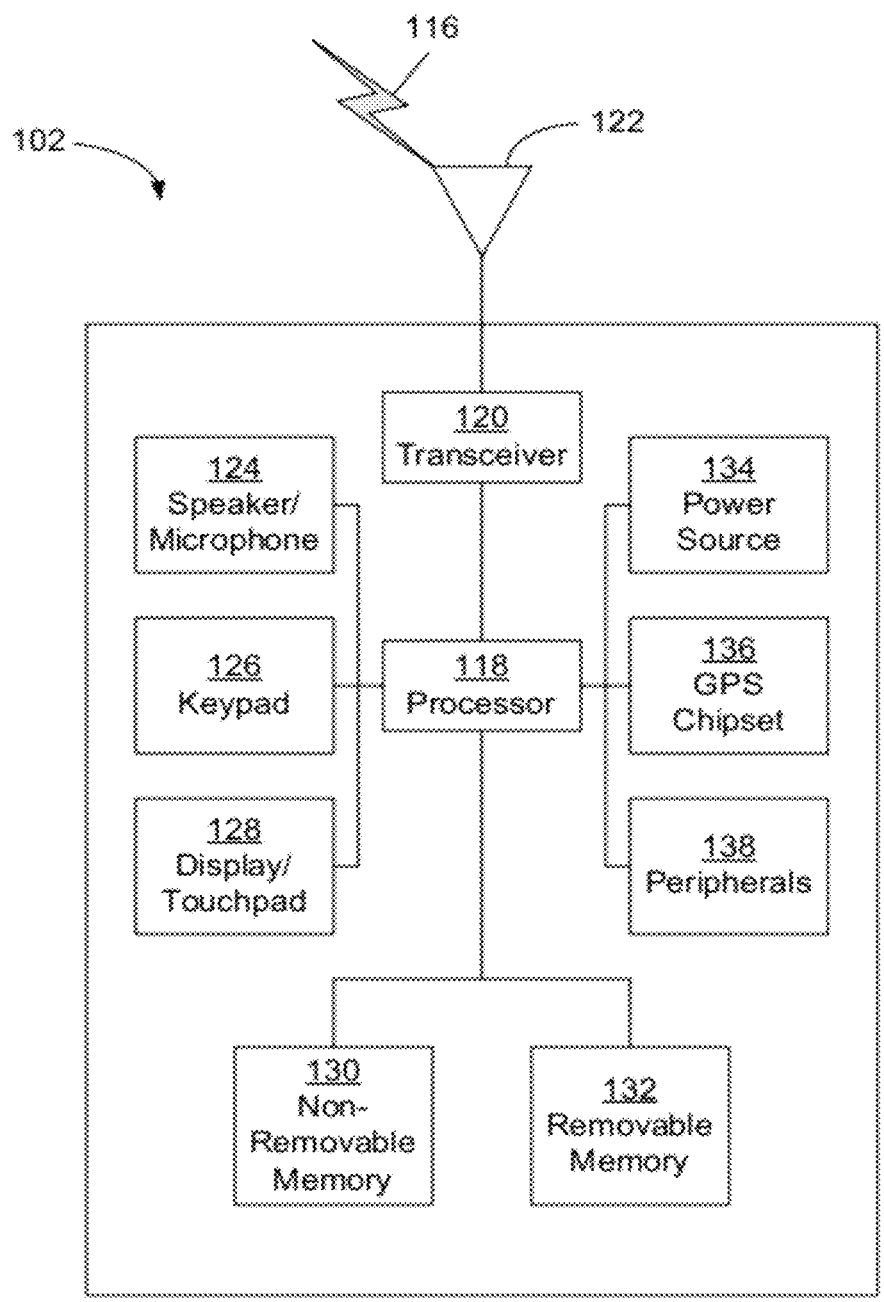
FIG. 1B is a system diagram of an example wireless transmit/receive unit (WTRU) that may be used within the communications system illustrated in FIG. 1A.

FIG. 1B is a system diagram of an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and other peripherals 138. It will be appreciated that the WTRU 102 may include any sub-combination of the foregoing elements while remaining consistent with an embodiment. It is noted that the components, functions, and features described with respect to the WTRU 102 may also be similarly implemented in a base station.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1C:
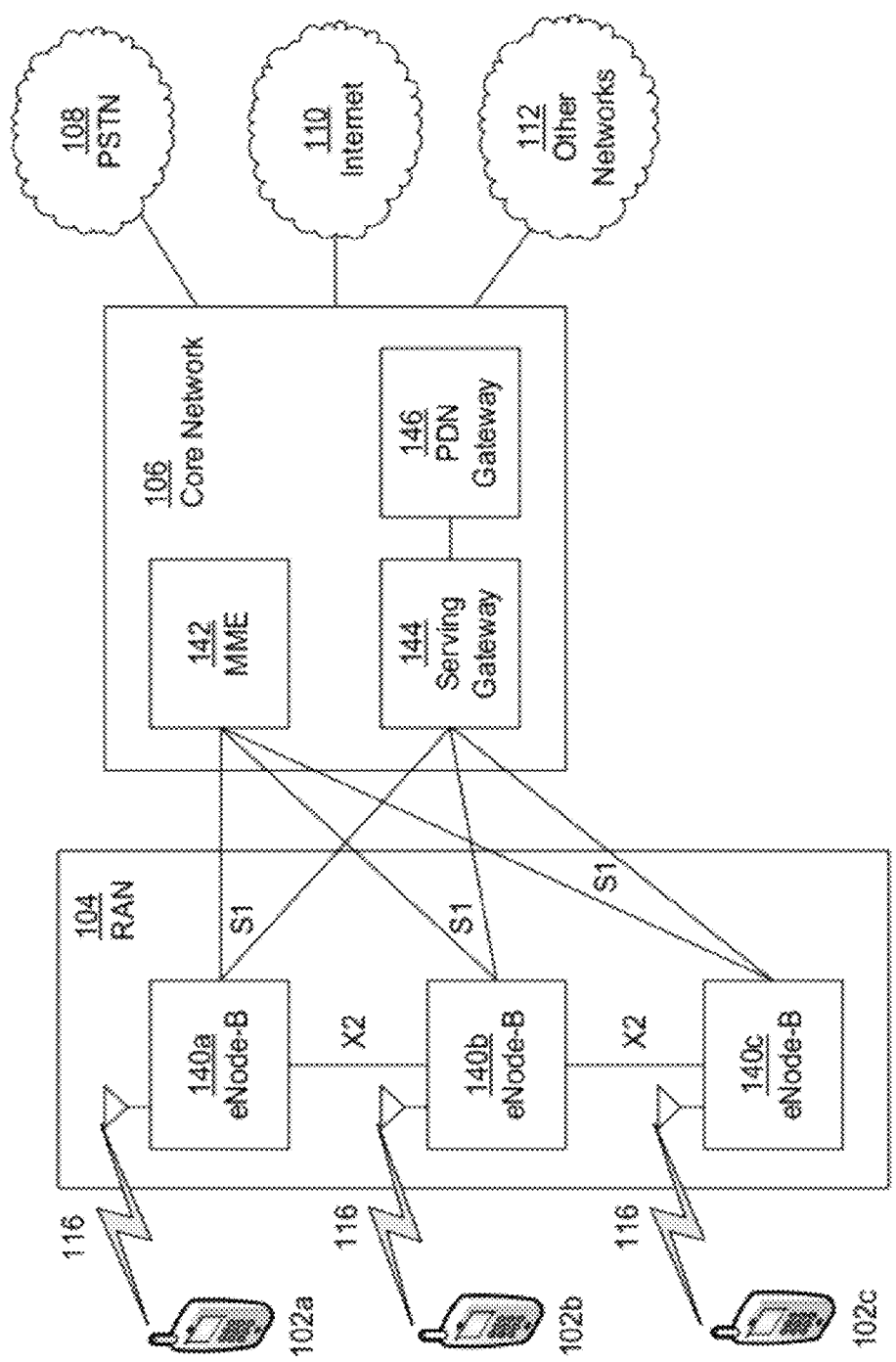
FIG. 1C is a system diagram of an example radio access network and an example core network that may be used within the communications system illustrated in FIG. 1A.

FIG. 1C is a system diagram of the RAN 104 and the core network 106 according to an embodiment. As noted above, the RAN 104 may employ an E-UTRA radio technology to communicate with the WTRUs 102a, 102b, 102c over the air interface 116. The RAN 104 may also be in communication with the core network 106.

The RAN 104 may include eNode-Bs 140a, 140b, 140c, though it will be appreciated that the RAN 104 may include any number of eNode-Bs while remaining consistent with an embodiment. The eNode-Bs 140a, 140b, 140c may each include one or more transceivers for communicating with the WTRUs 102a, 102b, 102c over the air interface 116. In one embodiment, the eNode-Bs 140a, 140b, 140c may implement MIMO technology. Thus, the eNode-B 140a, for example, may use multiple antennas to transmit wireless signals to, and receive wireless signals from, the WTRU 102a.

Each of the eNode-Bs 140a, 140b, 140c may be associated with a particular cell (not shown) and may be configured to handle radio resource management decisions, handover decisions, scheduling of users in the uplink and/or downlink, and the like. As shown in FIG. 1C, the eNode-Bs 140a, 140b, 140c may communicate with one another over an X2 interface.

The core network 106 shown in FIG. 1C may include a mobility management gateway (MME) 142, a serving gateway 144, and a packet data network (PDN) gateway 146. While each of the foregoing elements are depicted as part of the core network 106, it will be appreciated that any one of these elements may be owned and/or operated by an entity other than the core network operator.

The MME 142 may be connected to each of the eNode-Bs 142a, 142b, 142c in the RAN 104 via an S1 interface and may serve as a control node. For example, the MME 142 may be responsible for authenticating users of the WTRUs 102a, 102b, 102c, bearer activation/deactivation, selecting a particular serving gateway during an initial attach of the WTRUs 102a, 102b, 102c, and the like. The MME 142 may also provide a control plane function for switching between the RAN 104 and other RANs (not shown) that employ other radio technologies, such as GSM or WCDMA.

The serving gateway 144 may be connected to each of the eNode Bs 140a, 140b, 140c in the RAN 104 via the S1 interface. The serving gateway 144 may generally route and forward user data packets to/from the WTRUs 102a, 102b, 102c. The serving gateway 144 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 144 may also be connected to the PDN gateway 146, which may provide the WTRUs 102a, 102b, 102c with access to packet-switched networks, such as the Internet 110, to facilitate communications between the WTRUs 102a, 102b, 102c and IP-enabled devices.

The core network 106 may facilitate communications with other networks. For example, the core network 106 may provide the WTRUs 102a, 102b, 102c with access to circuit-switched networks, such as the PSTN 108, to facilitate communications between the WTRUs 102a, 102b, 102c and traditional land-line communications devices. For example, the core network 106 may include, or may communicate with, an IP gateway (e.g., an IP multimedia subsystem (IMS) server) that serves as an interface between the core network 106 and the PSTN 108. In addition, the core network 106 may provide the WTRUs 102a, 102b, 102c with access to the networks 112, which may include other wired or wireless networks that are owned and/or operated by other service providers.

Figure 2:
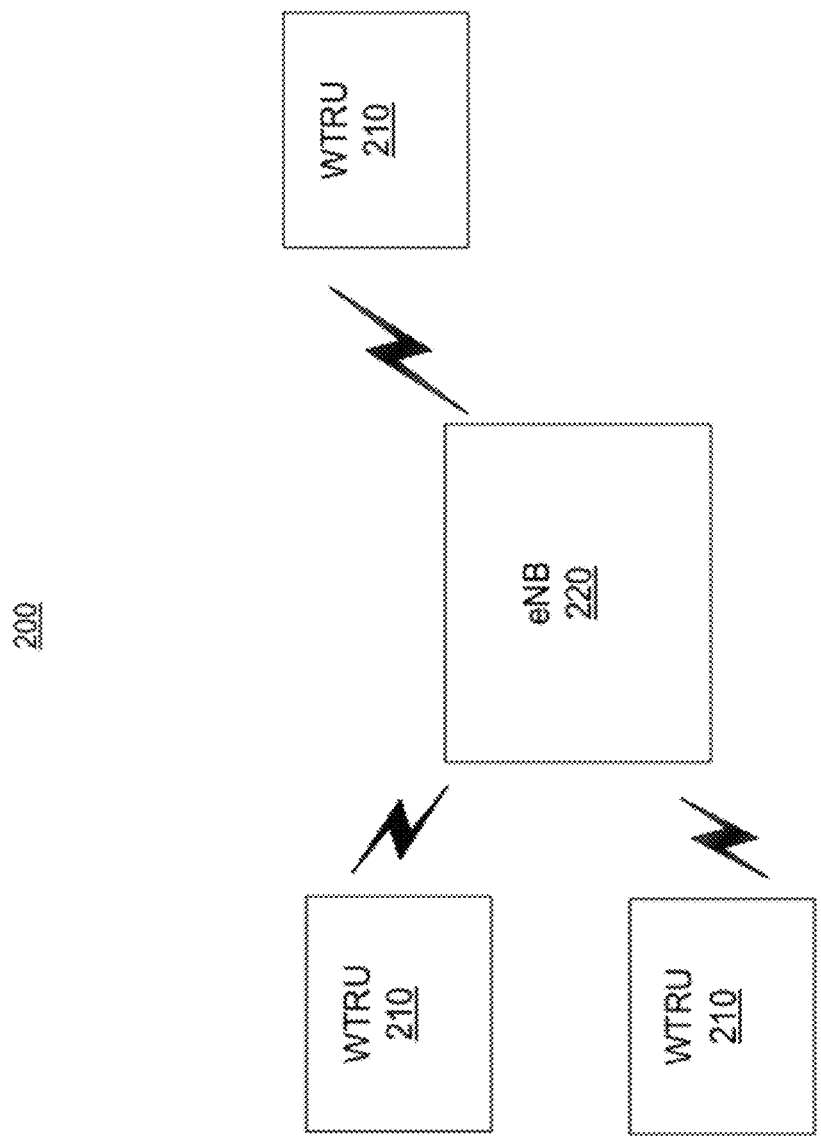
FIG. 2 is a block diagram of a wireless communication system including a plurality of WTRUs and an eNodeB (eNB)

FIG. 2 illustrates a block diagram of a wireless communication system 200 including a plurality of WTRUs 210 and an eNodeB (eNB) 220. As shown in FIG. 2, the WTRUs 210 are in communication with the eNB 220. Although three WTRUs 210 and one eNB 220 are shown in FIG. 2, it should be noted that any combination of wireless and wired devices may be included in the wireless communication system 200.

Figure 3:
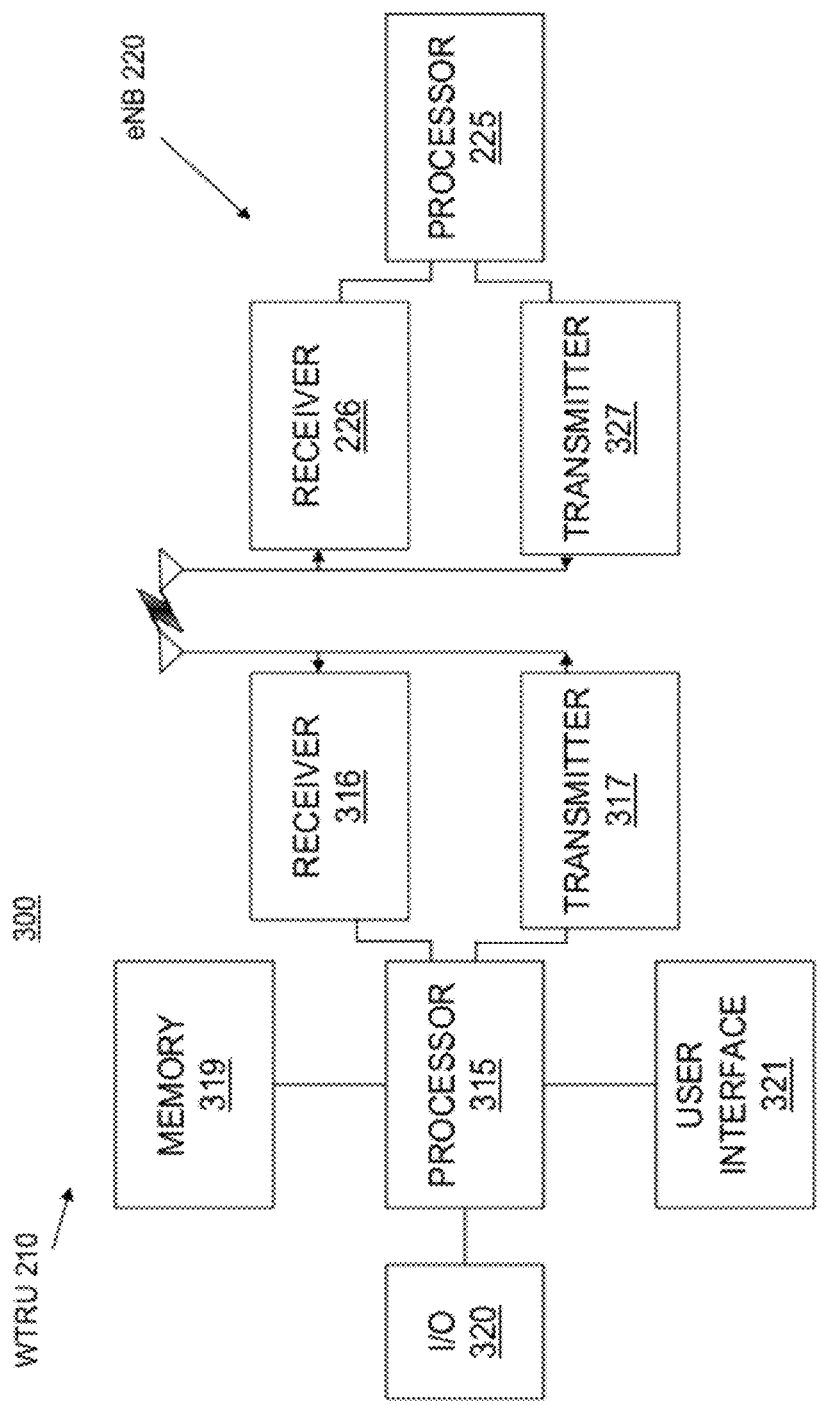
FIG. 3 is a function block diagram of a WTRU and the base station of the wireless communication system of FIG. 2.
Figure 4:
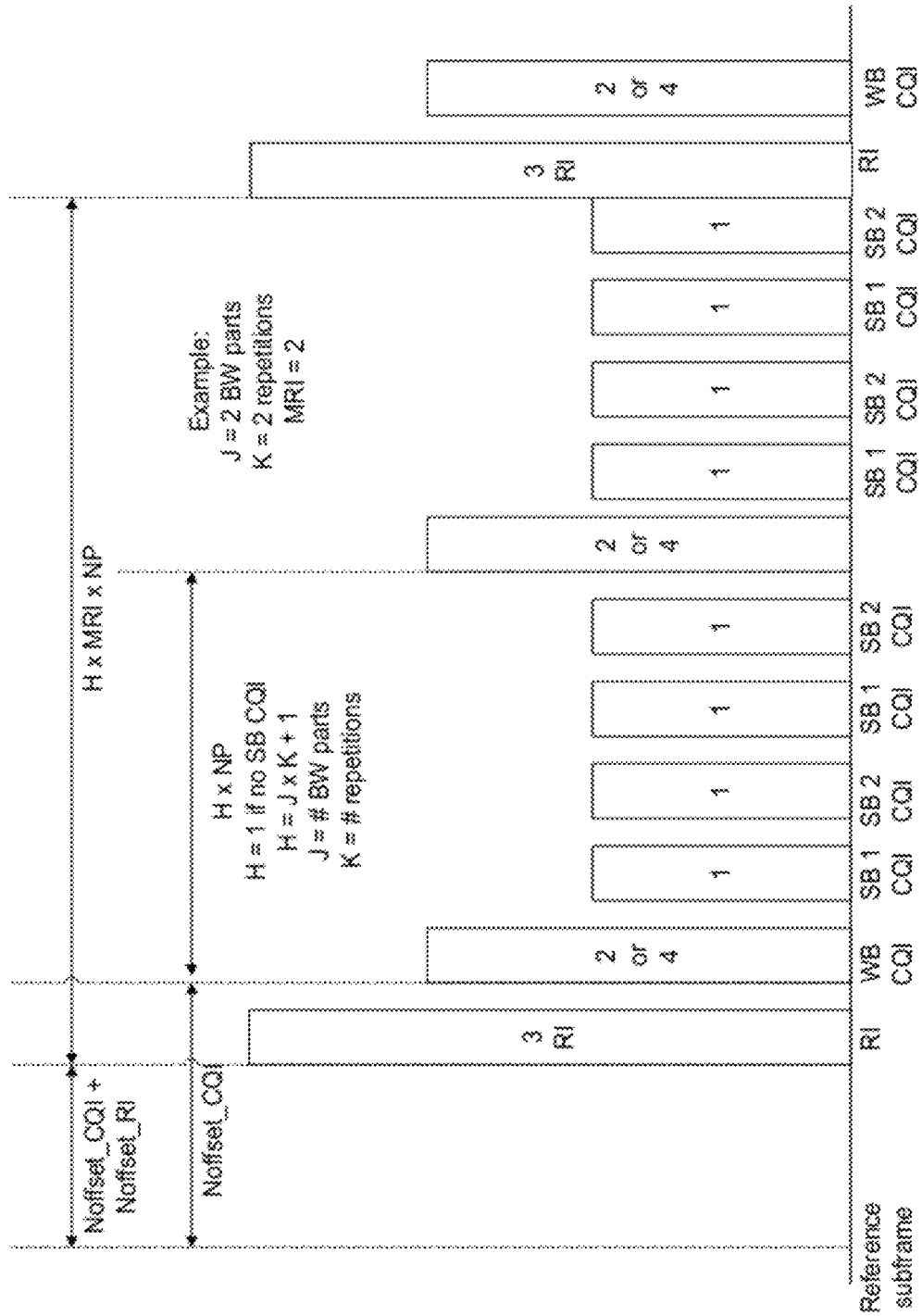
FIG. 4 is a diagram of an example reporting sequence.

FIG. 3 is a function block diagram 300 of a WTRU 210 and the base station 220 of the wireless communication system 200 of FIG. 2. As shown in FIG. 2, the WTRU 210 is in communication with the eNB 220. The WTRU 210 is configured to receive instructions and parameters for feedback reporting, including, for example, a CQI, from the eNB 220.

The eNB 220 may be configured to transmit, and the WTRU 210 configured to receive and monitor signals on the broadcast channel (BCH). The WTRU 210 may also be configured to receive messages on the BCH, measure CQI, and transmit CQI reports to the eNB 220. The WTRU 210 may transmit on any uplink channel, such as a RACH, for example, The WTRU 210 may be configured to transmit and receive radio resource control (RRC) messages and layer 1 (L1) messages.

In addition to the components that may be found in a typical WTRU, the WTRU 210 includes a processor 315, a receiver 316, a transmitter 317, and an antenna 318. The WTRU 210 may also include a user interface 321, which may include, but is not limited to, an LCD or LED screen, a touch screen, a keyboard, a stylus, or any other typical input/output device. The WTRU 210 may also include memory 319, both volatile and non-volatile, as well as interfaces 320 to other devices, such as universal serial bus (USB) ports, serial ports and the like. The receiver 316 and the transmitter 317 are in communication with the processor 315. The antenna 318 is in communication with both the receiver 316 and the transmitter 317 to facilitate the transmission and reception of wireless data.

In addition to the components that may be found in a typical eNB, the eNB 220 includes a processor 325, a receiver 326, a transmitter 327, and an antenna 328. The receiver 326 and the transmitter 327 are in communication with the processor 325. The antenna 328 is in communication with both the receiver 326 and the transmitter 327 to facilitate the transmission and reception of wireless data.

When a WTRU begins communicating with an eNB, it may access a shared uplink channel, such as the random access channel. Accessing the RACH is a process that may include multiple messaging between a WTRU and an eNB. This is because the RACH is contentious, and many WTRUs may be attempting to use the RACH at the same time.

Channel state information (CSI) feedback may be reported in the format of rank, precoder matrix index (PMI), and channel quality indicator (CQI). PMI may be calculated at a WTRU by quantizing the communication channel against a predefined codebook. CSI feedback may include CQI/PMI/rank indication (RI) reports and may be provided on either a periodic or an aperiodic basis. Parameters required to control the information reported by the WTRU may be either based on system bandwidth, or may be provided in an RRC connection setup, reconfiguration, and reestablishment messages. The information reported by the WTRU may vary based on the transmission mode, which may be defined in the same RRC messages. Table 1 below sets forth a summary of example R8/R9 reporting modes.

TABLE 1

| Transmission Mode | Aperiodic Feedback | Periodic Feedback |
| --- | --- | --- |
| 1: Port 0<br>2: Tx Diversity<br>3: Open Loop SM (large delay CDD) (or Tx Diversity)<br>7: Port 5 (or port 0 or Tx Div)<br>8 (without PMI): Port 7/8 (or single port or Tx Div): | Mode 2-0: WTRU selected sub band CQI: WB CQI + CQI over M best subbands<br>Mode 3-0: HL configured sub band CQI: WB CQI + subband CQI<br>Notes: CQI for first CW, no PMI | Mode 1-0: WB CQI<br>Mode 2-0: WTRU selected sub band CQI: WB CQI + WTRU reports CQI in preferred subband in each BW part, one BW part in each reporting opportunity<br>Note: CQI for first CW, no PMI |
| 4: Closed Loop SM<br>6: Closed Loop Rank 1 Precoding (or Tx Div)<br>8 (with PMI): Port 7/8 (or single port or Tx Div): | Mode 1-2: WB CQI/Multiple PMI: CQI for each CW; PMI for each subband<br>Mode 2-2: WTRU selected sub band CQI/multiple PMI: CQI per CW and PMI, both | Mode 1-1: WB CQI/single PMI<br>Mode 2-1: WTRU selected subband CQI/single PMI ($N^{DL}_{RB}$ > only): WB CQI/PMI + WTRU reports CQI in |

TABLE 1-continued

| Transmission Mode | Aperiodic Feedback | Periodic Feedback |
| --- | --- | --- |
| | over full BW and M best subbands<br>Mode 3-1: HL configured sub band CQI/single PMI: WB CQI + subband CQI, both per CW | preferred subband in each BW part |
| 5: MU-MIMO (or Tx Div) | Mode 3-1: HL configured sub band CQI/single PMI (see above) | |

Periodic feedback may be transmitted on the PUCCH channel. In the alternative, periodic feedback may be transmitted on the PUSCH channel, if available. In LTE-A, PUCCH and PUSCH channels may be transmitted in the same subframe, thus in this case, periodic feedback may be transmitted on the same PUCCH channel. Periodic reporting may use a sequence of different types of reports including, but not limited to: Type 1—subband CQI; Type 2—wideband CQI/PMI; Type 3—RI; and Type 4—wideband CQI. FIG. 3 illustrates a diagram of an example reporting sequence, where the number in each rectangle corresponds to the aforementioned report type.

Aperiodic feedback may be requested by a Format 0 downlink control information (DCI) or a random access response (RAR) when the CQI request bit is set or by some other indicator. This feedback may be transmitted on the PUSCH channel.

In accordance with embodiments of the present disclosure, reporting may be provided based on long-term feedback without relying on short-term feedback. Herein, the terms "long-term feedback" and "short-term feedback" may be used interchangeably with the terms "long-term precoder" and "short-term precoder," respectively. When channel coherence time (determined by the velocity of the WTRU) is smaller than the delay of the WTRU feedback (which may include WTRU measurement, encoding, transmission time, and time waiting for a feedback interval), then the WTRU may be considered to have high mobility. High mobility may be considered to occur at speeds greater than 30 kilometers per hour.

In an embodiment, pseudo-open-loop beamforming methods and systems are provided for allowing a system to take advantage of long-term feedback in the absence of short-term feedback. In a pseudo-open-loop beamforming feedback configuration (or mode), a WTRU may report long-term feedback, but not the short-term precoder, and the base station may use one predefined short-term precoder, denoted herein as $W_2(i)$, to combine with the WTRU-reported long-term precoder $W_1$ to obtain an overall precoder W at a given subframe.

In an example, a WTRU may have knowledge of the predetermined short-term precoder $W_2(i)$ so that it may calculate the reported CQI based on the assumption that the overall precoder may be built by combining the reported long-term feedback and the predefined short-term precoder, for example $W=W_1 \times W_2(i)$. The predefined short-term precoder $W_2(i)$ belongs to a predefined set of precoders $\{W_2(1), W_2(2), \ldots, W_2(N)\}$, where $N \geq 1$. Both the base station and the WTRU may know which $W_2(i)$ to use in a given sub-frame according to a formula of system parameters such as sub-frame index, cell ID, WTRU ID, and the like. With long-term precoder reported, this example method may allow the base station to separate MU-MIMO users efficiently in spatial domain. In an example, the set of precoders may include one precoder, i.e., $N=1$. With one precoder as in this example, the large-delay cyclic delay diversity (CDD) precoder may be used as the predefined short-term precoder.

Figure 5:
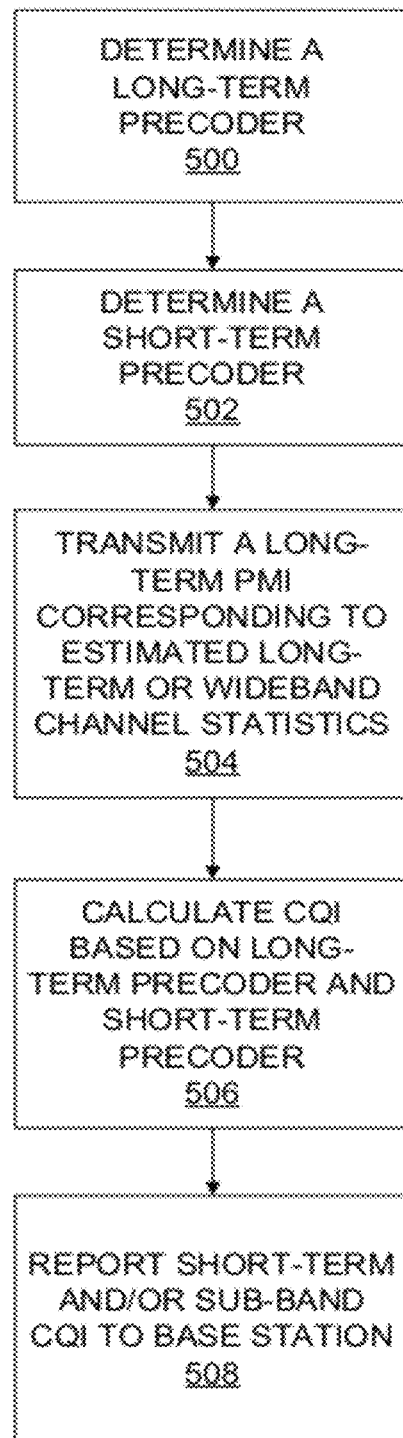
FIG. 5 is a flow chart of a method of feedback reporting in accordance with embodiments of the present disclosure.

FIG. 5 illustrates a flow chart of a method of feedback reporting in accordance with embodiments of the present disclosure. In an example, the method may be implemented by the WTRU 210 shown in FIG. 3, although the method may be implemented by any suitable WTRU.

Referring to FIG. 5, the method includes determining a long-term precoder (step 500). For example, the WTRU 210 shown in FIG. 3 may measure a communication channel between the WTRU 210 and a base station, such as the eNB 220 shown in FIG. 2, to determine long-term wideband channel statistics (e.g., a correlation matrix). The statistics may be averaged over time and frequency (or may use an instantaneous measurement). The WTRU 210 may quantize the long-term wideband channel statistics according to the long-term codebook and may obtain a corresponding long-term precoding matrix index, which may represent long-term precoder $W_1$.

The method of FIG. 5 includes determining a short-term precoder (step 502). For example, the WTRU 210 shown in FIG. 3 may access a set of predefined short-term precoders and determine one of the precoders for use for the purpose of CQI determination in the subsequent steps according to the predetermined rule described.

The method of FIG. 5 includes transmitting a long-term PMI corresponding to the estimated long-term or wideband channel statistics (step 504). For example, the long-term PMI may be reported a specified long-term feedback report interval or upon aperiodic report request by the base station.

The method of FIG. 5 includes calculating CQI based on the long-term precoder and the short-term precoder (step 506). For example, the WTRU 210 shown in FIG. 3 may calculate the CQI based on an assumption that the overall precoder is built by combining the reported long-term precoder $W_1$ and a predefined short term precoder $W_2(i)$, for example, $W=W_1 \times W_2(i)$. The method may include subsequently reporting the short-term and/or sub-band CQI to the base station (step 508). In an example, the WTRU may transmit the CQI to the base station via one or more RRC messages.

In another embodiment, an RI feedback mechanism is provided. It is noted that in a codebook construction method that uses multi-granular feedback (MGF) in 3GPP RAN1 for LTE-A, the overall precoder $W=W^{(1)}W^{(2)}$, and the $N_T \times \tilde{N}_T \times r$ precoder $W^{(2)}$. For the MGF-based codebook construction method according to an embodiment, the total rank information in bits may be defined as $K=\log_2 \min(N_T, N_R)$. It is noted that $N_T$ is the number of Tx antennas at the a base station (e.g., an eNB), and $N_R$ is the number of Rx antennas at the WTRU. The RI of the outer precoder may be defined as $K_2 <= K$, and $M=2^{K_2}$. The RI of the inner precoder may be defined as $K_1 = K - K_2$.

The RI report of inner precoder $W^{(1)}$, say $R^{(1)}$, may have a reduced range and may include $K_1 = \log_2 (\min(N_T, N_R)/M)$ bits. For example, if the value of M is selected as 2, and the RI report of the inner precoder $W^{(1)}$ may be limited to an even number rank. Then, for an example antenna configuration of $N_T = N_R = 8$, then K1=2 and the reported $R^{(1)}$ can take values of 2, 4, 6, and 8. That is, for example, the inner precoder $W^{(1)}$ may be reported to be 8×2, 8×4, 8×6, and 8×8.

The RI report of inner precoder $W^{(2)}$ may have a reduced range and may include $K_2 = \log_2 M$ bits. For example, the value of M may be chosen to be 2, and the RI report of the inner precoder $W^{(1)}$ may be limited to an even number rank. Then, for an example antenna configuration of $N_T = N_R = 8$, $K_2 = 1$, the reported $R^{(2)}$ can take values of $R^{(1)} - 1$ or $R^{(1)}$.

Figure 6:
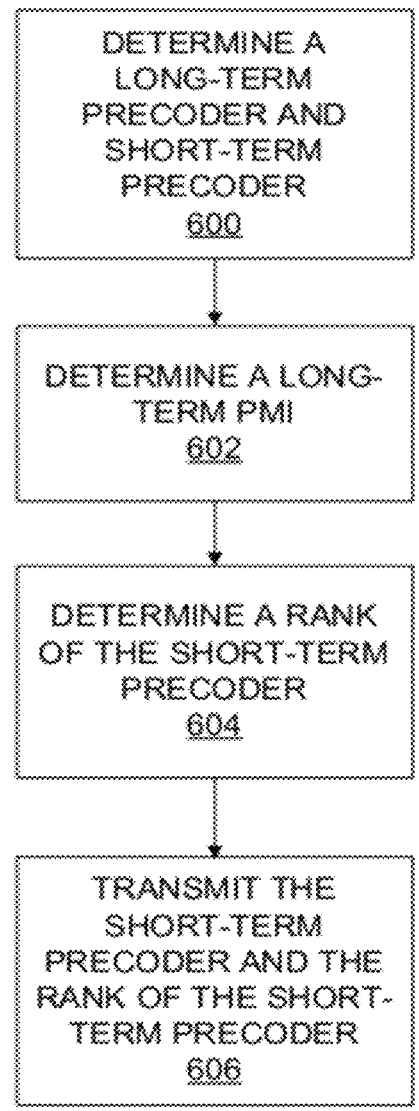
FIG. 6 is a flow chart of a method of measuring and reporting CSI feedback to a base station in accordance with embodiments of the present disclosure.

FIG. 6 illustrates a flow chart of a method of measuring and reporting CSI feedback to a base station in accordance with embodiments of the present disclosure. In an example, the method may be implemented by the WTRU 210 shown in FIG. 3, although the method may be implemented by any suitable WTRU.

Referring to FIG. 6, the method includes determining a long-term precoder and short-term precoder (step 600). For example, the WTRU 210 shown in FIG. 3 may measure a communication channel between the WTRU 210 and a base station, such as the eNB 220 shown in FIG. 2, to determine a long-term wideband spatial correlation matrix. The matrix may be averaged over time and frequency (or may use an instantaneous measurement). The WTRU 210 may quantize the long-term wideband spatial correlation according to the long-term codebook and may obtain a corresponding long-term precoding matrix index, which may represent long-term precoder $W_1$. In the quantization, the WTRU 210 may select an appropriate rank of the long-term precoding matrix out of a predefined range of value (K1 bits). The WTRU 210 shown in FIG. 3 may access a set of predefined short-term precoders and select one of the precoders for use as the short-term precoder. The rank of the long-term precoder may also be feedback into various parts of the system.

The method of FIG. 6 includes transmitting a long-term PMI corresponding to the estimated long-term or wideband channel statistics (step 602). For example, the long-term PMI may be reported a specified long-term feedback report interval or upon aperiodic report request by the base station.

The method of FIG. 6 includes determining a rank of the short-term precoder based on the rank of the long-term precoder (step 604). For example, the WTRU 210 shown in FIG. 3 may select the short-term or sub-band PMI and rank according to a predefined criterion. In an example, the resulting CQI may be maximized for the corresponding overall codebook. The rank of the short-term or sub-band PMI may be selected out of a limited range of values (K2 bits), which may be dependent on the reported rank of the long-term precoder. The method of FIG. 6 includes transmitting the short-term precoder and the rank of the short-term precoder to a base station (step 606).

In another embodiment within the framework of adaptive codebook construction, the long-term precoder W1 may be a quantized correlation matrix R. In this case, the rank of the long-term precoder W1 may be fixed to be a full rank and is not reported to the base station. Further, the rank report for short-term feedback (W2) may include $K = \log_2 \min(N_T, N_R)$ bits. For example, for an 8×8 antenna configuration, the rank report for short-term feedback (W2) includes 3 bits.

Figure 7:
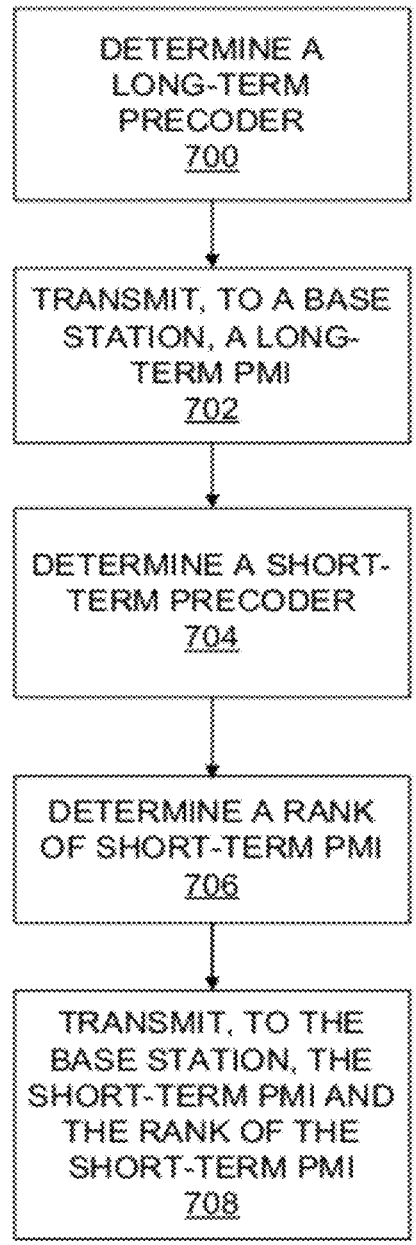
FIG. 7 is a flow chart of a method of feedback reporting in accordance with embodiments of the present disclosure.

FIG. 7 illustrates a flow chart of a method of feedback reporting in accordance with embodiments of the present disclosure. In an example, the method may be implemented by the WTRU 210 shown in FIG. 3, although the method may be implemented by any suitable WTRU.

Referring to FIG. 7, the method includes determining a long-term precoder (step 700). For example, the WTRU 210 shown in FIG. 3 may measure a communication channel between the WTRU 210 and a base station, such as the eNB 220 shown in FIG. 2, to determine a long-term wideband spatial correlation matrix. The matrix may be averaged over time and frequency (or may use an instantaneous measurement). The WTRU 210 may quantize the long-term wideband spatial correlation according to the long-term codebook and may obtain a corresponding long-term precoding matrix index, which may represent long-term precoder $W_1$. In the quantization, the WTRU 210 may assume the rank of the long-term precoding matrix to be full rank, $\log_2 \min(N_T, N_R)$. In an example, the rank information may not be reported in the long-term feedback.

The method of FIG. 7 includes transmitting, to a base station, a long-term PMI corresponding to the long-term precoder (step 702). For example, the WTRU 210 may transmit, to the eNB 220 shown in FIG. 2, a long-term PMI corresponding to the estimated long-term wideband spatial correlation matrix. The long-term PMI may be reported a specified long-term feedback report interval or upon aperiodic report request by the base station.

The method of FIG. 7 includes determining a short-term PMI (step 704) and determining a rank of the short-term PMI (step 706). For example, the WTRU 210 may select the short-term or sub-band PMI $W_2$ and rank according to a predefined criterion. In an example, the resulting CQI may be maximized for the corresponding overall codebook $W = W_1 \times W_2$.

The method of FIG. 7 includes transmitting, to the base station, the short-term PMI and the rank of the short-term PMI (step 708). For example, the WTRU 210 may report the selected short-term or sub-band PMI and associated rank information to base station.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

Suitable processors includes, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

A processor in association with software may be used to implement a radio frequency transceiver for use in a WTRU, UE, terminal, base station, radio network controller (RNC), or any host computer. The WTRU may be used in conjunction with modules, implemented in hardware and/or software, such as a camera, a video camera module, a videophone, a speakerphone, a vibration device, a speaker, a microphone, a television transceiver, a hands free headset, a keyboard, a BLUETOOTH® module, a frequency modulation (FM) radio unit, a liquid crystal display (LCD) display unit, an organic light-emitting diode (OLED) display unit, a digital music player, a media player, a video game player module, an Internet browser, and/or any wireless local area network (WLAN) module.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed:

1. A method of feedback reporting using long-term feedback when short-term feedback is absent, the method comprising:
at a wireless transmit receiver unit (WTRU):
determining a long-term precoder based on a long-term precoding matrix index corresponding to one or more channel statistics;
determining a short-term precoder based on a formula associated with one or more system parameters, wherein the short-term precoder is determined based on the formula associated with the one or more system parameters by accessing a set of predefined precoders stored in the WTRU and accessible thereby and selecting the short-term precoder from the set of predefined precoders using the formula associated with the one or more system parameters, the one or more system parameters comprising at least one of the following: sub-frame index, cell identifier (ID), and WTRU ID;
calculating channel quality index (CQI) based on a combination of the long-term precoder and the short-term precoder; and
transmitting the CQI to a base station.

2. The method of claim 1, wherein determining the long-term precoder based on the long-term precoding matrix index corresponding to the one or more channel statistics comprises:
measuring a communication channel between the WTRU and the base station to determine long-term wideband channel statistics;
quantizing the long-term wideband channel statistics based on a long-term codebook; and
obtaining the long-term precoding matrix index based on the long-term wideband channel statistics and quantized long-term wideband channel statistics.

3. The method of claim 1, wherein transmitting the CQI to the base station comprises transmitting the CQI to the base station via one or more radio resource control (RRC) messages.

4. The method of claim 1, comprising transmitting the long-term precoder to the base station.

5. The method of claim 4, wherein transmitting the long-term precoder comprises transmitting the long-term precoder to the base station at a predefined interval.

6. A method of feedback reporting using long-term feedback when short-term feedback is absent, the method comprising:
at a wireless transmit receiver unit (WTRU):
determining a long-term precoder corresponding to a long-term precoding matrix index based on long-term wideband spatial correlation matrix and a predefined short-term precoder based on a formula associated with one or more system parameters, wherein the predefined short-term precoder is determined based on the formula associated with the one or more system parameters by accessing a set of predefined precoders stored in the WTRU and accessible thereby and selecting the predefined short-term precoder from the set of predefined precoders using the formula associated with the one or more system parameters, the one or more system parameters comprising at least one of the following: sub-frame index, cell identifier (ID), and WTRU ID;
determining a rank of the long-term precoder based on a predefined range of values;
determining a rank of the short-term precoder based on the rank of the long-term precoder; and
transmitting the short-term precoder and the rank of the short-term precoder to a base station.

7. The method of claim 6, wherein determining the long-term precoder corresponding to the long-term precoding matrix index based on the long-term wideband spatial correlation matrix comprises:
measuring a communication channel between the WTRU and the base station to determine the long-term wideband spatial correlation matrix; averaging the long-term wideband spatial correlation matrix;
quantizing the long-term wideband spatial correlation matrix based on a long-term codebook; and
obtaining the long-term precoding matrix index corresponding to the long term precoder based on one or more of the following: the measured long-term wideband spatial correlation matrix, the averaged long-term wideband correlation matrix, or the quantized long-term wideband channel correlation matrix.

8. The method of claim 6, wherein the predefined range of values comprises a plurality of bits.

9. The method of claim 6, wherein the predefined range of values is defined based on a number of transmitter antennas of the base station.

10. The method of claim 6, wherein the predefined range of values is defined based on a number of receiver antennas of the WTRU.

11. The method of claim 6, wherein the predefined range of values corresponds to rank information of an inner precoder.

12. The method of claim 6, wherein transmitting the short-term precoder and the rank of the short-term precoder to the base station comprises transmitting the short-term precoder and the rank of the short-term precoder to the base station via one or more radio resource control (RRC) messages.

13. The method of claim 6, further comprising transmitting the long-term precoder to the base station.

14. The method of claim 13, wherein transmitting the long-term precoder comprises transmitting the long-term precoder to the base station at a predefined interval.

\* \* \* \* \*